United States Patent [19]

Panster et al.

[11] Patent Number: 4,999,413

[45] Date of Patent: Mar. 12, 1991

[54] ORGANOSILOXANE AMINE COPOLYCONDENSATES, METHOD OF THEIR PREPARATION AND USE (II)

[75] Inventors: Peter Panster, Rodenbach; Horst Grethe; Peter Kleinschmit, both of Hanau, all of Fed. Rep. of Germany

[73] Assignee: Degussa Aktiengesellschaft, Frankfurt am Main, Fed. Rep. of Germany

[21] Appl. No.: 431,220

[22] Filed: Nov. 3, 1989

[30] Foreign Application Priority Data

Nov. 4, 1988 [DE] Fed. Rep. of Germany ....... 3837416

[51] Int. Cl.$^5$ ............................................. C08G 77/22
[52] U.S. Cl. ........................................ 528/30; 528/32; 528/38; 528/41
[58] Field of Search ........................ 528/30, 32, 38, 41

[56] References Cited

U.S. PATENT DOCUMENTS 4,455,415  6/1984  Panster et al. ..................... 528/30
4,845,163  7/1989  Panster et al. ..................... 528/38

Primary Examiner—Melvyn I. Marquis
Assistant Examiner—Karen A. Hellender
Attorney, Agent, or Firm—Beveridge, DeGrandi & Weilacher

[57] ABSTRACT

Organosiloxane amine copolycondensates as statistic or block copolycondensates or mixtures thereof consisting of the units

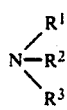 (I)

and

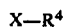 (II)

in which $R^1$ to $R^4$ is

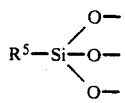 (III)

and $R^5$ is bound directly to the nitrogen atom or the single-bonding X group and is alkylene, cycloalkylene or

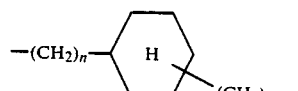

or

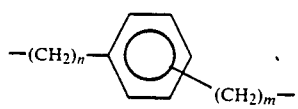

in which n is 1 to 6 and m 0 to 6. The free valences of the oxygen atoms bound to the silicon atom are saturated by silicon atoms of further groups of formula III, optionally with the inclusion of cross-linking agents, X stands for

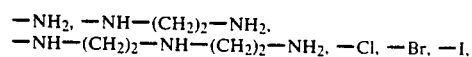
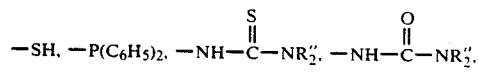

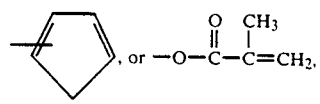

in which R'' is H or alkyl. In addition, preparation methods and the use of the products for the removal of dissolved metals from the liquid phase or for the adsorption of gaseous compounds.

22 Claims, No Drawings

ORGANOSILOXANE AMINE COPOLYCONDENSATES, METHOD OF THEIR PREPARATION AND USE (II)

Introduction and Background

The present invention relates to copolycondensates of a tertiary organosiloxane amine with one or more other siloxane components. In another aspect, the invention relates to methods of preparing and using these new copolycondensates. The copolycondensates can be present with the same chemical composition in various forms, e.g. as so-called block copolymers, statistical copolymers or so-called mixed copolymers. The new polymer products are insoluble in water and organic solvents and are specially suitable as carriers of active substances, as ion exchangers, as metal adsorbent and as adsorbents for organic molecules.

Insoluble organosiloxane amines are known from German patent 31 20 214. These known products are distinguished by especially good chemical and physical properties, especially in comparison to analogous systems based on organic polymers or also on specially modified, inorganic polymer systems. These known organosiloxane amines can be used as a weakly basic ion exchanger, as an adsorbent, as an active-substance carrier, as a carrier of heterogenized, homogeneous catalysts or as a heterogeneous base in base-catalyzed reactions.

The matrix of these known products can be produced in a quasi-tailored manner. For example in relation to an aspect which could be important for a use as catalytic carrier, the density of functional groups can be regulated by the inclusion of cross-linking agents containing silicon, titanium, zirconium and aluminum. These products can thus be modified chemically in many ways in order to make them compatible with the multiple applications. However, this modifying capability refers only to the inclusion of chemically non-functional groupings because these polymers exhibit a secondary or a tertiary amine grouping as the sole functionality.

However, in the meantime it has proven to be advantageous in various applications of these polysiloxanes to combine differently functional groups in one polymer matrix. Effects can be produced by this combination which are greater than the sum of the actions of the individual components (synergism). At the same time, further possibilities are presented by the different possibilities of the arrangement of the differing functionalities in the polymer system, optionally in combination with cross-linking agents. On the basis of the especially advantageous material properties of the tertiary organosiloxane amines described in German patent 31 20 214 and of the favorable polycondensation behavior of the corresponding monomers, the problem of developing copolycondensates in which one component is a tertiary amino siloxane has been considered.

SUMMARY OF THE INVENTION

An object of the invention is to provide organosiloxane amine copolycondensates which are characterized in that they consist of units of the formula:

(I)

and of units of the formula:

(II)

in which $R^1$ and $R^4$ are identical or different and signify a group of the general formula:

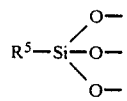
(III)

wherein $R^5$ is bound directly to the nitrogen atom or to the single-bonding X group and represents a linear or branched alkylene group with 1 to 10 C atoms, a cycloalkylene group with 5 to 8 C atoms or a unit of the general formula:

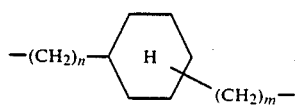

or

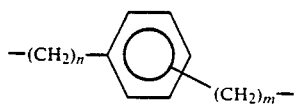

in which n is a number from 1 to 6 and indicates the number of methylene groups in the nitrogen position or in X position and m is a number from 0 to 6, whereby the free valences of the oxygen atoms bound to the silicon atoms are saturated as in a silica lattice by silicon atoms of further groups of formula III and/or via the metal atoms in one or more cross-linking bridge members:

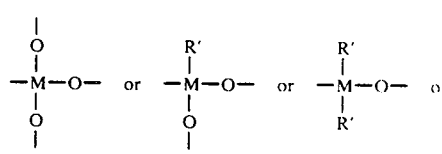
(IV)

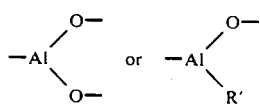

M is a silicon, titanium or zirconium and R' is a linear or branched alkyl group with 1 to 5 C atoms and the ratio of the silicon atoms from the groups of the general formula III to the metal atoms in the bridge members is 1 : 0 to 1 : 10, and X in formula II stands for

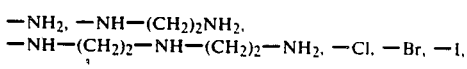

-continued $-SH, -P(C_6H_5)_2, -NH-\overset{S}{\underset{\|}{C}}-NR''_2, -NH-\overset{O}{\underset{\|}{C}}-NR''_2,$

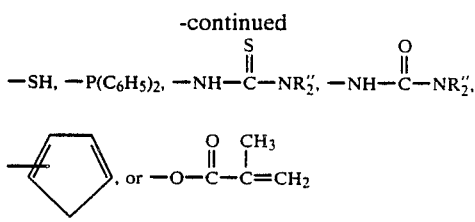, or $-O-\overset{O}{\underset{\|}{C}}-\overset{CH_3}{\underset{|}{C}}=CH_2$ wherein R″ is identical to H or signifies a linear or branched alkyl group with 1 to 5 C atoms.

The ratio of the two components according to formula I and formula II can be varied as desired and can be within the limits of 0.01 : 99.99 mole % to 99.99 : 0.01 mole %. However, preferred compositions contain at least 5 mole % units according to formula I and at the most 95 mole % units according to formula II and vice versa. The ratio to be selected in practice depends primarily on the intended use of the particular copolycondensate and the chemical and physical properties required for this use, thus, for example, on whether a high density of functional groups according to formula II is desired or not. This aspect can play an important part in certain end uses, such as for example in the use as catalytic carrier.

The ratio of the two components also is a factor regarding the form of the copolycondensates; that is, whether they are a so-called statistic copolycondensate (random copolycondensate) or a so-called block copolycondensate or a so-called mixed copolycondensate.

According to the invention, the new copolycondensates can be present in each of the three named forms as regards the units according to formulas I, II and IV. This means that in the case of a purely statistic or random copolycondensate which contains units according to formula I and II and optionally also units according to formula IV, a purely statistical distribution of the components is present. This corresponds to the molar ratios of the initial products, taking into consideration the silicon groupings according to formula III present in the case of units I and II and the functionality of the cross-linking-agent grouping IV.

In the case of a so-called block copolycondensate, a formation of blocks of identical units according to formula I and II and optionally IV is present.

Finally, a so-called mixed copolycondensate exhibits both structures of a statistic copolycondensate as well as of a block copolycondensate. The units according to formula I or formula II or formula IV can be present thereby both as statistic and also as block copolycondensate.

The monomeric components of the copolycondensates of the invention are, in principle, known compounds, e.g. of the formulas:

$N[(CH_2)_3Si(OCH_3)_3]_3$ $H_2N-(CH_2)_3Si(OC_2H_5)_3$ $H_2N-(CH_2)_2-HN-(CH_2)_3Si(OCH_3)_3$ $(C_6H_5)_2P-CH_2-Si(OC_3H_7)_3$

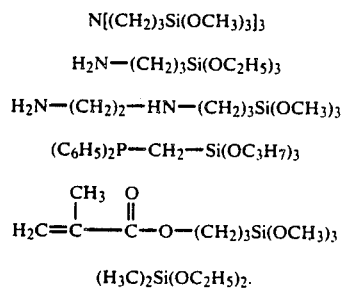

$(H_3C)_2Si(OC_2H_5)_2.$

The composition of the polymer units obtainable therefrom can be described by the formulas:

$N[(CH_2)_3SiO_{3/2}]_3$ $H_2N-(CH_2)_3SiO_{3/2}$ $H_2N-(CH_2)_2-HN-(CH_2)_3SiO_{3/2}$ $(C_6H_5)_2P-CH_2-SiO_{3/2}$

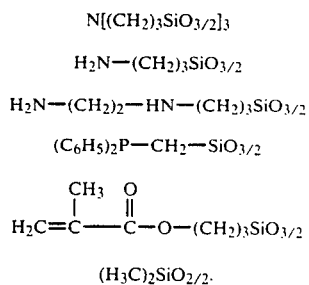

$(H_3C)_2SiO_{2/2}.$

Special advantages regarding the availability of the initial materials and the material properties of the final products are achieved with copolymers which consist of units of the formulas I and II in which $R^1$ to $R^4$ stand for a group of the formula:

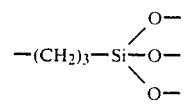

Methods of preparing the new copolycondensates represents another aspect of the present invention. A method according to which statistic copolycondensates are obtained provides for a reaction between (a) a tertiary amino organosilane of the general formula:

 (V)

together with (b) an organofunctional silane $X-R^9$ (VI)

corresponding to the desired stoichiometric composition of the copolycondensate to be prepared.

In the above formulas, $R^6$ to $R^9$ can be identical or different and signify a group of the general formula:

 (VII)

$R^5$ has the same meaning as in formula III, $R^{10}$ signifies a linear or branched alkyl group with 1 to 5 C atoms and X has the same meaning as in formula II.

Optionally, there may be added to the reaction between (a) and (b) one or more cross-linking agents of the general formula:

$M(OR)_{2-4}R'_{0-2}$ or $M(OR)_{2-3}R'_{0-1}$ (VIII)

wherein

M is a silicon, titanium, zirconium or aluminum atom,

R′ is a linear or branched alkyl group with 1 to 5 C atoms or a phenyl group and R is a linear or branched alkyl group with 1 to 5 C atoms and wherein the ratio of the silicon atoms from the groups of general formula VII to the metal atoms in the bridge members is 1 : 0 to 1 : 10.

The reaction between the above described reacting components is carried out by dissolving all reactants in a solvent which is miscible with water to a great extent but dissolves amino organosilane according to formula V and organofunctional silane according to formula vI as well as cross-linking agents. An amount of water is added to the solution under agitation which suffices at least for a complete hydrolysis and condensation. The reaction mixture is then gelled under further agitation at a certain temperature in a range from room temperature up to 200° C., the developing solid formed in the reaction is agitated further, optionally after the addition of more solvent or water, up to 48 hours at room temperature to 200° C. at normal pressure or at a pressure which corresponds to the sum of the partial pressures at the particular pressure. The solid copolycondensate formed thereby is separated according to conventional techniques from the liquid phase, optionally washed, dried at room temperature to 250° C. Optionally, the drying can be carried out under an atmosphere of protective gas or in a vacuum. Also, the product can be tempered subsequently for 1 to 100 hours at temperatures ranging from 150° to 300° C. under an atmosphere of protective gas or in a vacuum. Further, if desired the solid product can be ground and/or classified by size.

Instead of the alkoxy silyl compounds, the corresponding halogenide or phenoxy compounds can also be used in principle as initial materials; however, their use offers no advantages but rather can cause problems, e.g. in the case of the chlorides, on account of the hydrochloric acid liberated during hydrolysis.

The hydrolysis of the initial reaction materials (a) and (b) and optional cross-linking agents must be carried out in a solvent which is miscible with water to a great extent but which also dissolves the initial materials. Alcohols are preferably used for this purpose which correspond to the alkoxy groupings on the monomeric precursors of the initial materials or to alkoxy groups connected to the metal atoms of the optional cross-linking agents. Methanol, ethanol, n- and i-propanol, n- and i-butanol or n-pentanol are especially suitable. Mixtures of such lower aliphatic alcohols can also be used as solvent in the hydrolysis. Instead of alcohols, other polar solvents which are miscible with water to a great extent can also be used; however, this is less favorable for engineering reasons on account of the heterogeneous solvent mixtures which arise with the alcohol hydrolytically split off in the course of the reaction.

The hydrolysis is preferably carried out with an excess of water above the stoichiometrically required amount. The amount of water necessary for hydrolysis depends on the hydrolysis speed of the particular silanes or cross-linking agents used in such a fashion that as the amount of water increases, a more rapid hydrolysis occurs; however, an upper limit can be given due to separation and formation of a two-phase system. Basically, a hydrolysis reaction carried out in homogeneous solution is to be preferred. Due to the two aspects cited, somewhat less water by weight is used in practice than the weight sum of organosilane and cross-linking agent.

The polycondensation reaction of this invention can be carried out at various temperatures. Since the polycondensation proceeds most rapidly at rather high temperatures, it is simplest to allow it to occur at reflux temperature or just thereunder. However, this can take place in principle at an even higher temperature under pressure. The reaction mixture can solidify to a solid mass during the polycondensation. It is appropriate for this reason to add a sufficient amount of solvent or water for dilution for the reaction mixture.

The solvent will as a rule be the same as that which was already used in the hydrolysis of the silanes, that is, a lower alcohol with 1 to 5 C atoms is preferably used. Naturally, water can also be used for dilution as an alternative to a dilution with a solvent. That which is used in the individual instance also depends on which physical properties should be exhibited by the ultimate copolycondensate to be prepared. The duration and temperature of the postreaction, which can take up to 48 hours, can also exert an influence hereby. As a rule, a postreaction at a rather high temperature results in an increase of mechanical stability and a strengthed structure of the product formed.

The separation of the solid formed by the reaction as described can take place according to conventional techniques such as filtration, decanting or centrifuging or also by distilling off the liquid phase. The washing of the solid formed is preferably carried out with the solvent used during the precipitation of the solid product of reaction, or with water. The step of tempering the final product often proves to be useful as regards an increase in the physical stability of the polycondensates.

The dried and/or tempered product can be classified in customary devices into different particle-size fractions. The various product workup measures of washing, drying, tempering and classifying can be eliminated or carried out in any suitable sequence, depending on the circumstances. A classification can also be performed for example on a product which is still moist with liquid, or one that has been dried or tempered.

The hydrolysis time is a function of the tendency to hydrolyze of the initial reacting materials and/or the cross-linking linking agent and of the temperature. The susceptibility for hydrolysis and therewith the hydrolytic speed of reaction depend in particular on the type of alkoxy groups in the silicon or titanium, zirconium or aluminum position. The methoxy group hydrolyses the most rapidly and a retardation occurs as the chain length increases. Hydrolysis and polycondensation can therefore be accelerated not only by the addition of bases such as ammonia but also of customary condensation catalysts such as dibutyl tin diacetate. In order to compensate for differing hydrolytic and polycondensation behavior of the respective monomeric components of a statistical, optionally cross-linked copolycondensate, the monomeric components according to formulas V and VI and the cross-linking agent or agents which are optionally present can be precondensed at first in accordance with a process variant of the invention.

To this end, the amino silane according to formula V, the monomeric component according to formula VI and the cross-linking agent or agents according to formula VIII are precondensed together 5 minutes to 72 hours with or without using one of the previously selected solvents (preferably an alcohol with 1 to 5 C atoms corresponding to the alkoxy groups is used) in the presence of 1 to 100, preferably 1 to 50 mole % of the amount of water stoichiometrically required for complete hydrolysis, at room temperature to 200° C. A further condensation catalyst in addition to the amino organosilane present can also be added in order to favor this precondensation effect. Ammonia is used with preference. After the precondensation has taken place, the complete hydrolysis and polycondensation are performed as already described.

The above-mentioned "amount of water stoichiometrically required for a complete hydrolysis" can actually be more than 100 mole % in the precondensation. Since the use of excess stoichiometric amounts of water can be indicated for complete hydrolysis and a complete course of the condensation reaction which is reasonable as regards the time, the use of the mentioned, theoretical maximum concentration in certain instances does not mean at all that the precondensation phase is rapidly passed through or omitted. However, in most instances the hydrolysis agent for the precondensation is used in amounts which are under the minimum amount theoretically necessary for a complete hydrolysis and condensation.

According to another method of the invention, block copolycondensates are obtained in which there is a formation of blocks of identical units according to formulas I and II and, optionally, of one or more units according to formula IV. This method provides for the independent precondensation of each a tertiary amino organosilane of the general formula V and of an organofunctional silane of formula VI, wherein $R^6$ to $R^9$ as well as X have the same meaning as above, and, optionally, of one or more cross-linking agents of the general formula:

$$M(OR)_{2-4}R'_{0-2} \text{ or } M(OR)_{2-3}R'_{0-1}$$

in which M, R and R' likewise have the same meaning given above. The independent precondensation reaction is carried out for 5 minutes to 72 hours with or without using a solvent in the presence of 1 to 100, preferably 1 to 50 mole % of the particular amount of water that is stoichiometrically required for complete hydrolysis at room temperature to 200° C. Thereafter, the precondensates are combined and then, after the addition of more water and, optionally, further solvent (so that at least the amount of water required for a complete hydrolysis and polycondensation is present), the complete hydrolysis and polycondensation is carried out as already described above. Naturally, in this process variation the entire reaction mixture can also solidify to a solid mass after the gelling process. It would then also be appropriate to add a sufficient amount of more solvent or water for dilution.

The precondensation can be accelerated by the addition of a slight amount of, preferably, a basic condensation catalyst such as e.g. ammonia or also a suitable tin compound. The amount of water used for the precondensation depends on which degree of oligomerization, that is, which block size is to be achieved. When more water is used for precondensation, naturally larger units are produced than when less water is used. The duration of the precondensation generally depends, as has already been discussed, on the susceptibility for hydrolysis of the monomeric components and the temperature selected for the reaction.

According to a further method variation of the invention, so-called mixed copolycondensates are obtained in which a formation of blocks of identical units according to formula I and/or formula II and/or of one or more units according to formula IV is present. In addition, there is present in such mixed copolycondensate reaction mixtures at least one non-precondensed monomeric component and at least one precondensed monomeric component. This method provides that only one of the monomers of formulas V and VI or crosslinking agents of the general formula VIII are precondensed. The precondensation which is independently carried out is for 5 minutes to 72 hours with or without using a solvent in the presence of 1 to 100 mole % of the amount of water stoichiometrically required for complete hydrolysis at room temperature to 200° C. Optionally a condensation catalyst can be added. Then the precondensate is combined with the noncondensed component and then the previously described process is followed for the completion of the hydrolysis and polycondensation of the entire mixture after the addition of more water and, optionally, more solvent. The further treatment of the polycondensate formed thereby then proceeds as in the other methods described.

The new organosiloxane amine copolycondensates are characterized in particular by the quantitative hydrolysis yields, the elementary analyses and by the determination of the individual functionalities.

Purely optically, there is no difference between the copolycondensates obtained according to the various production methods. Depending on the pretreatment, the copolycondensates of the invention exhibit surfaces of 0.1 to 1000 m²/g and particle-size diameters of approximately 1 cm to 1 μm. A preferred particle-size range can be readily set thereby.

The decomposition points for the copolycondensates naturally depend on the given individual functionalities. However, they are generally located distinctly above 100° C. in the air and above 150° C. when placed under an atmosphere of protective gas.

In addition to the general applicability of the copolycondensates as active-substance carriers in the broadest sense, a special aspect of the invention resides in the use of copolycondensates for the removal of dissolved metals from a liquid, aqueous or organic phase according to the static or the dynamic principle. In this case X stands for the complexing groups:

$$-NH_2, -NH-(CH_2)_2-NH_2.$$

$$-NH-(CH_2)_2-NH-(CH_2)_2-NH_2, -SH, -P(C_6H_5)_2.$$

$$\begin{matrix} & S \\ & \parallel \\ -NH-&C-NR''_2 \end{matrix}$$

in which R'' has the same range of meaning as previously given.

Further, more particular aspects of the invention include the use of the copolycondensates for the adsorptive binding of gaseous, organic compounds, preferably organic solvents and of water vapor. The specific pore volume, the pore diameter and the surface properties are particularly important for this capacity for adsorption. These factors can be influenced on the one hand via the preparation and posttreatment methods of the invention and also on the other hand via the chemical composition, e.g. by means of the inclusion of crosslinking agent groups with a hydrophobing action into the polysiloxane skeleton. The recovery of the adsorbed, organic compounds or of the water is easily permitted by elevating the temperature and/or by gassing with heated air.

DETAILED EMBODIMENTS OF THE INVENTION

The following examples are illustrative of the present invention.

Example 1

44.3 g (0.20 mole) $H_2N-(CH_2)_3Si(OC_2H_5)_3$ and 126.0 g (0.20 mole) $N[(CH_2)_3Si(OC_2H_5)_3]_3$ were dissolved in 200 ml ethanol. The solution was heated to reflux temperature and compounded under agitation with 100 ml desalinated water. The solution was agitated 30 minutes longer under reflux, then cooled down to 60° C. and slowly agitated until the gelling started after approximately 30 min. Five minutes after the start of gelling, the mixture was diluted with 300 ml water, reheated to reflux temperature and agitated 2 hours longer at this temperature. Then, it was cooled off, the solid formed filtered off and washed twice with 300 ml ethanol each time. After a 12-hour drying at 130° C. and subsequent 12-hour tempering at 160° C. under an atmosphere of $N_2$, 79.0 g (97.1% of theory) polymeric product were obtained consisting of polymer units of the formula:

| $H_2N-(CH_2)_3-SiO_{3/2}.N[(CH_2)_3SiO_{3/2}]_3.$ | | | | |
|---|---|---|---|---|
| Analyses: | % C | % H | % N | % Si |
| Theory: | 35.4 | 6.4 | 6.9 | 27.6 |
| Observed: | 34.7 | 6.3 | 6.6 | 27.0 |
| Specific surface: | 531 m²/g. | | | |

Example 2

Starting with 22.2 g (0.1 mole) $H_2N-(CH_2)_2-NH-(CH_2)_3Si(OCH_3)_3$ and 251.9 g (0.5 mole) $N[(CH_2)_3Si(OCH_3)_3]_3$, 158.0 g (96.6% of theory) polymeric product were obtained analogously to example 1. Methanol was used instead of ethanol. The product consisted of polymer units of the formula:

| $0.2H_2N-(CH_2)_2-NH-(CH_2)_3SiO_{3/2}.N[(CH_2)_3SiO_{3/2}]_3.$ | | | | |
|---|---|---|---|---|
| Analyses: | % C | % H | % N | % Si |
| Theory: | 36.7 | 6.3 | 6.0 | 27.5 |
| Observed: | 37.5 | 6.5 | 6.3 | 26.9 |
| Specific surface: | 456 m²/g. | | | |

Example 3

307.5 g (1.0 mole) $H_2N-(CH_2)_2-NH-(CH_2)_2-NH-(CH_2)_3Si(OC_2H_5)_3$, 126.0 g (0.2% mole) $N[(CH_2)_3Si(OC_2H_5)_3]_3$ and 625.0 g (3.0 mole) $Si(OC_2H_5)_4$ were combined in a six-liter three-neck flask with reflux condenser and KPG agitator. After the addition of 50 ml water, the mixture was agitated 1 hour at 80° C. at first. Then, 1 liter ethanol and another 400 ml water were added and the mixture agitated under reflux until gelling started. 1 liter ethanol was added to the gelling batch for dilution. The entire reaction mixture was subsequently transferred into a 10-liter autoclave and agitated 6 hours at 150° C. Then, a filtration was performed, a rewash with a total of 1 liter ethanol and a drying for 24 hours at 130° C. under a protective-gas atmosphere of $N_2$. After 2 hours of grinding in a ball mill, 418.4 g (96.0% of theory) fine, polymeric product were obtained consisting of polymer units of the formula:

| $H_2N-(CH_2)_2-NH-(CH_2)_2-NH-(CH_2)_3SiO_{3/2}.0.2N[(CH_2)_3SiO_{3/2}]_3.3SiO_2.$ | | | | |
|---|---|---|---|---|
| Analyses: | % C | % H | % N | % Si |
| Theory: | 24.2 | 5.0 | 10.3 | 29.6 |
| Observed: | 23.7 | 4.8 | 10.5 | 28.8 |
| Specific surface: | 581 m²/g. | | | |

Example 4

240.8 g (1.0 mole) $Cl-(CH_2)_3Si(OC_2H_5)_3$ and 264.4 g (1.0 mole) $Si(OC_3H_7)_4$ were combined together with 100 ml isopropanol in a 4-liter three-neck flask with KPG agitator and reflux condenser. After the addition of 15 ml $H_2O$, the mixture was heated to reflux temperature and agitated 2 hours under reflux at first. Then, 189.0 g (0.3 mole) $N[(CH_2)_3Si(OC_2H_5)_3]_3$ and 148.3 g (1.0 mole) $(CH_3)_2Si(OC_2H_5)_2$ and a further 300 ml isopropanol and 200 ml water were added and the mixture agitated under reflux until gelling started. 500 ml isopropanol were again added to the mixture for dilution. After a further agitation of 1 hour, the mixture was cooled down, the solid formed centrifuged from the liquid phase and dried 12 h at 150° C. under protective gas. 342.6 g (97.1% of theory) polymeric product were obtained consisting of polymer units of the formula:

| $Cl-(CH_2)_3SiO_{3/2}.0.3N[(CH_2)_3SiO_{3/2}]_3.SiO_2.(CH_3)_2SiO_{2/2}.$ | | | | | |
|---|---|---|---|---|---|
| Analyses: | % C | % H | % N | % Cl | % Si |
| Theory: | 26.2 | 5.0 | 1.2 | 10.0 | 31.0 |
| Observed: | 25.6 | 4.7 | 0.9 | 9.3 | 30.2 |
| Specific surface: | 326 m²/g. | | | | |

Example 5

100.8 g (0.2 mole) $N[(CH_2)_3Si(OCH_3)_3]_3$ were compounded in a 250 ml three-neck flask with KPG agitator and reflux condenser with 5 ml water and agitated 1 hour at 60° C. Parallel thereto, 39.9 g (0.2 mole) of the mercapto-functional silane $HS-(CH_2)_3Si(OCH_3)_3$ were likewise compounded in a 100 ml flask with 5 ml water and likewise agitated 1 hour at 60° C. After passage of this time, the two precondensates were dissolved in a total of 200 ml methanol, combined in a 2-liter three-neck flask, compounded with another 50 ml water and refluxed until gelling started. The suspension was diluted with 300 ml water, agitated another hour under reflux and then worked up in an analogous manner as example 1. 82.0 g (96.0% of theory) of a block copoly-condensate were obtained consisting of units of the formula:

| $N[(CH_2)_3SiO_{3/2}]_3.HS-(CH_2)_3SiO_{3/2}.$ | | | | | |
|---|---|---|---|---|---|
| Analyses: | % C | % H | % N | % S | % Si |
| Theory: | 33.7 | 5.9 | 3.3 | 8.3 | 26.3 |
| Observed: | 32.9 | 5.8 | 3.1 | 7.9 | 25.6 |
| Specific surface: | 570 m²/g. | | | | |

Example 6

Starting with 69.7 g (0.20 mole $(C_6H_5)_2P-(CH_2)_3-Si(OCH_3)_3$ and 100.8 g (0.20 mole) $N[(CH_2)_3Si(OCH_3)_3]_3$, 110.3 g (95.8% of theory) of a block copolycondensate were obtained analogously to example 5 and consisting of units of the formula:

| $N[(CH_2)_3SiO_{3/2}]_3.(C_6H_5)_2P-(CH_2)_3SiO_{3/2}.$ | | | | | |
|---|---|---|---|---|---|
| Analyses: | % C | % H | % N | % P | % Si |
| Theory: | 50.1 | 6.0 | 2.4 | 5.4 | 19.5 |
| Observed: | 49.4 | 5.8 | 2.2 | 4.8 | 18.9 |
| Specific surface: | 85 m²/g. | | | | |

Example 7

71.4 g (0.1 mole) N[(CH$_2$)$_8$Si(OCH$_3$)$_3$]$_3$, 29.8 g (0.1 mole) (H$_3$CO)$_3$Si-(CH$_2$)$_3$-NH-CS-N(C$_2$H$_5$)$_2$ and 20.8 g (0.1 mole) Si(OC$_2$H$_5$)$_4$ were combined in 100 ml ethanol. The mixture was compounded with 30 ml 1% NH$_3$ solution, heated to reflux temperature and agitated under reflux until gelling started (approximately 3 hours). After the addition of another 50 ml ethanol, the mixture was agitated another 3 hours under reflux, then the solid formed was filtered off and dried 24 hours at 130° C. under an atmosphere of N$_2$. 74.8 g (94.0% of theory) polymeric product were obtained consisting of polymer units of the formula:

| N[(CH$_2$)$_8$SiO$_{3/2}$]$_3$.(C$_2$H$_5$)$_2$N—CS—NH—(CH$_2$)$_3$SiO$_{3/2}$.SiO$_2$. | | | | | |
|---|---|---|---|---|---|
| Analyses: | % C | % H | % N | % S | % Si |
| Theory: | 48.3 | 8.2 | 5.3 | 4.0 | 17.6 |
| Observed: | 47.6 | 8.0 | 4.9 | 3.6 | 16.8 |

Example 8

Starting with 100.8 g (0.2 mole) N[(CH$_2$)$_3$Si(OCH$_3$)$_3$]$_3$ and 44.5 g (0.2 mole) (H$_3$CO)$_3$Si-CH$_2$-NH-CO-N(CH$_3$)$_2$, 87.2 g (96.9% of theory) polymeric product were obtained analogously to example 1 and consisting of polymer units of the formula:

| N[(CH$_2$)$_3$SiO$_{3/2}$]$_3$.(H$_3$C)$_2$N—CO—NH—CH$_2$—SiO$_{3/2}$. | | | | |
|---|---|---|---|---|
| Analyses: | % C | % H | % N | % Si |
| Theory: | 34.7 | 6.1 | 9.3 | 25.0 |
| Observed: | 34.1 | 5.7 | 8.8 | 24.8 |
| Specific surface: | 356 m$^2$/g. | | | |

Example 9

142.8 g (0.2 mole) N[(CH$_2$)$_5$Si(OC$_2$H$_5$)$_3$]$_3$, 54.1 g (0.2 mole) C$_5$H$_5$-(CH$_2$)$_3$-Si(OC$_2$H$_5$)$_3$ (cyclopentadienyl propyltriethoxysilane) and 21.2 g (0.1 mole) (C$_2$H$_5$)Ti(OC$_2$H$_5$)$_3$ were combined in a 1-liter three-neck flask and precondensed after the addition of 5 ml water for 3 hours at first at 80° C. After having been treated according to a method analogous to example 3, 115.6 g (97.9% of theory) polymeric product were obtained consisting of polymer units of the formula:

| N[(CH$_2$)$_5$SiO$_{3/2}$]$_3$.C$_5$H$_5$—(CH$_2$)$_3$—SiO$_{3/2}$.0.5(C$_2$H$_5$)TiO$_{3/2}$. | | | | | |
|---|---|---|---|---|---|
| Analyses: | % C | % H | % N | % Si | % Ti |
| Theory: | 28.5 | 4.0 | 2.4 | 19.0 | 4.1 |
| Observed: | 27.8 | 3.9 | 2.1 | 18.4 | 3.8 |

Example 10

63.0 g (0.1 mole) N[(CH$_2$)$_3$Si(OC$_2$H$_5$)$_3$]$_3$, 24.8 g (0.1 mole)

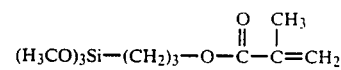

and 2.5 g (0.01 mole) Al(OC$_4$H$_9$)$_3$ were precondensed analogous with example 9 with 2 ml water, reacted further and worked up. 45.2 g (94.0% of theory) polymeric product were obtained consisting of units of the formula:

| N[(CH$_2$)$_3$SiO$_{3/2}$]$_3$.H$_2$C=C(CH$_3$)—C(O)—O—(CH$_2$)$_3$—SiO$_{3/2}$.0.1AlO$_{3/2}$. | | | | | |
|---|---|---|---|---|---|
| Analyses: | % C | % H | % N | % Si | % Al |
| Theory: | 40.0 | 6.1 | 2.9 | 23.4 | 0.6 |
| Observed: | 39.4 | 5.7 | 2.8 | 22.8 | 0.5 |
| Specific surface: 280 m$^2$/g. | | | | | |

Example 11

64.4 g (0.1 mole)

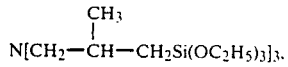

36.1 g (0.1 mole)

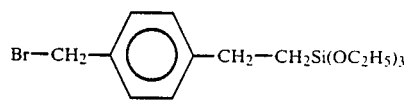

and 7.7 g (0.02 mole) Zr()C$_4$H$_9$)$_4$ were precondensed analogously to example 10 with 2 ml water, reacted further and worked up. 59.0 g (96.2% of theory) polymeric product were obtained consisting of polymer units of the formula:

N[CH$_2$—CH(CH$_3$)—CH$_2$SiO$_{3/2}$]$_3$.Br—CH$_2$—C$_6$H$_4$—CH$_2$CH$_2$—SiO$_{3/2}$.0.2ZrO$_2$.

| Analyses: | % C | % H | % N | % Br | % Si | % Zr |
|---|---|---|---|---|---|---|
| Theory: | 41.1 | 5.6 | 2.3 | 13.0 | 18.3 | 3.0 |
| Observed: | 40.6 | 5.4 | 2.0 | 12.7 | 17.8 | 2.8 |

Example 12

64.8 g (0.1 mole)

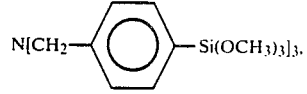

11.1 g (0.05 mole) H$_2$N-(CH$_2$)$_3$Si(OC$_2$H$_5$)$_3$ and 8.2 g (0.05 mole) C$_3$H$_7$-Si(OCH$_3$)$_3$ were precondensed analogous with example 10 with 2 ml water, reacted further and worked up. 50.1 g (97.1% of theory) polymeric product were obtained consisting of polymer units of the formula:

| Analyses: | % C | % H | % N | % Si |
|---|---|---|---|---|
| Theory: | 55.9 | 5.0 | 4.1 | 21.8 |
| Observed: | 54.9 | 4.8 | 3.8 | 20.9 |

Example 13

5 g of the $(H_5C_6)_2P$-functional polysiloxane prepared in accordance with example 6 were suspended in 50 ml water in which 100 mg rhodium had been dissolved. The suspension was agitated 3 hours at 80° C. and the solid subsequently filtered off. An analysis of the filtrate showed a residual Rh content of 0.7 ppm.

Example 14

5 g of the copolycondensate prepared in accordance with example 5 were suspended in 50 ml water in which 30 mg mercury had been dissolved. The suspension was agitated 3 hours at room temperature and the solid was then filtered off. An analysis of the filtrate now showed a mercury content of 50 ppb.

Example 15

5 g of the copolycondensate prepared in accordance with example 7 were suspended in 50 ml ethanol in which 50 mg palladium had been dissolved. The suspension was agitated 3 hours at reflux temperature and then the solid was filtered off. An analysis of the filtrate showed a residual Pd content of less than 1 ppm.

Example 16

5 g of the copolycondensate prepared in accordance with example 3 were suspended in 50 ml water in which 100 mg platinum had been dissolved. The suspension was agitated 2 hours at room temperature and then the solid was filtered off. An analysis of the filtrate showed a residual Pt content of less than 1 ppm.

Example 17

5 g of the copolycondensate prepared in accordance with example 4 were placed in a wash bottle. The wash bottle was thermostatted in a drying oven to 20° C. and loaded with an air current of 100 l/h which was charged with one fifth the saturation value with trichloroethane. The adsorption of trichloroethane was monitored by means of regularly checking the weight increase of the polymer. A weight increase of approximately 55 % was determined in the equilibrium state.

Example 18

A test analogous to example 17 using the copolycondensate prepared in example 2 and using toluene instead of trichloroethane resulted in a weight increase of 45%.

Example 19

A test analogous to example 17 using the copolycondensate prepared in example 9 and using n-hexane instead of trichloroethane resulted in a weight increase of 32%.

Further variations and modifications of the foregoing invention will be apparent to those skilled in the art and are intended to be encompassed by the claims appended hereto.

We claim:

1. An organosiloxane amine copolycondensate, obtained from at least one unit of the formula:

 (I)

and at least one unit of the formula:

$$X-R^4 \quad\quad (II)$$

in which $R^1$ to $R^4$ are identical or different and signify a group of the formula:

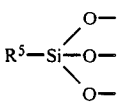 (III)

wherein $R^5$ is bound directly to the nitrogen or to the single-bonding X and represents a linear or branched alkylene with 1 to 10 C atoms, a cycloalkylene with 5 to 8 C atoms or a unit of the formula:

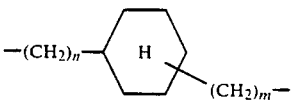

or

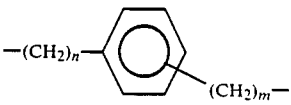

in which n is a number from 1 to 6 and represents the number of methylene groups in the nitrogen position or in the X position and m is a number from 0 to 6, wherein the free valences of the oxygen atoms bound to the silicon atoms are connected in a silica lattice by silicon atoms of further groups of formula III and/or via the metal atoms in one or more cross-linking bridge members:

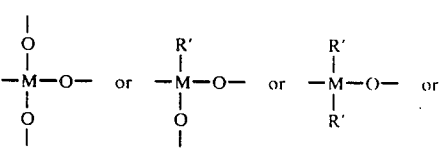 (IV)

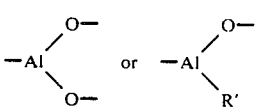

M is silicon, titanium or zirconium and R' is linear or branched alkyl with 1 to 5 C atoms or phenyl and the ratio of the silicon atoms from the formula III to the metal atoms in the bridge members is 1 :0 to 1: 10 and X in formula II stands for:

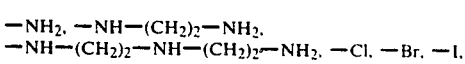

-continued

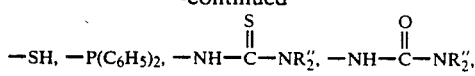

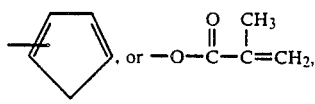

wherein R" is identical to H or signifies a linear or branched alkyl with 1 to 5 C atoms.

2. The organosiloxane amine copolycondensates according to claim 1, wherein the ratio of units of formula I to units of formula II is 0.01 : 99.99 to 99.99 : 0.01.

3. The organosiloxane amine copolycondensate according to claim 2, wherein the ratio is 5 : 95 to 95 : 5.

4. The organosiloxane amine copolycondensates according to claim 1, wherein the copolycondensate is in the form of a random copolycondensate, block copolycondensate or as a mixture thereof.

5. The organosiloxane amine copolycondensate according to claim 1, wherein $R^1$ to $R^4$ stand for a group of the formula:

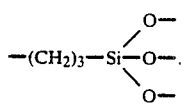

6. A method of preparing a random organosiloxane copolycondensate comprising dissolving a tertiary amino organosilane of the formula:

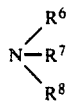 (V)

together with an organofunctional silane having the formula:

$$X-R^9 \quad (VI)$$

in an amount sufficient to form the desired copolycondensate $R^6$ and $R^9$ are identical or different and signify a group of the formula:

 (VIII)

$R^5$ is bound directly to the nitrogen or to the single-bonding X and represents a linear or branched alkylene with 1 to 10 C atoms, a cycloalkylene with 5 to 8 C atoms or a unit of the formula:

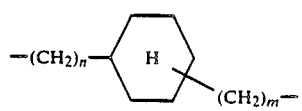

or

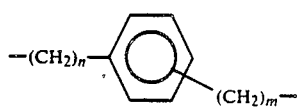

in which n is a number from 1 to 6 and represents the number of methylene groups in the nitrogen position or in the X position and m is a number from 0 to 6

$R^{10}$ signifies a linear or branched alkyl group with 1 to 5 C atoms and

X is:

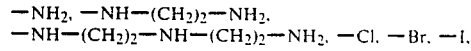

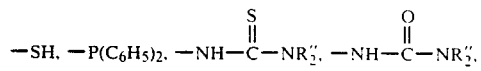

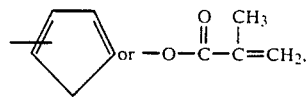

wherein R" is identical to H or signifies a linear or branched alkyl with 1 to 5 C atoms, optionally after the addition of one or more cross-linking agents of the formula:

$$M(OR_{2-4}R'_{0-2} \text{ or } Al(OR)_{2-3}R'_{0-1} \quad (VIII)$$

whereby M is a silicon, titanium or zirconium atom,
R' is a linear or branched alkyl with 1 to 5 C atoms or phenyl and
R is linear or branched alkyl with 1 to 5 C atoms and wherein the ratio of the silicon atoms from the groups of formula VII to the M or Al atoms in the cross-linking agent members is 1 : 0 to 1 :10, in a solvent which is miscible with water and is capable of dissolving amino organosilanes of formula V and organofunctional silanes of formula VI as well as cross-linking agents, to thereby form a reaction solution, adding an amount of water to the reaction solution under agitation which is sufficient at least for a complete hydrolysis and condensation, agitating the reaction solution mixture at a temperature in a range from room temperature to 200° C., to gel said reaction mixture to form a solid, agitating the solid further up to 48 hours at room temperature to 200° C. then separating the copolycondensate formed thereby from the solution to recover the product.

7. The method according to claim 6 wherein after separating the copolycondensate, the copolycondensate is washed and dried at room temperature to 250° C. to recover the product.

8. The method according to claim 7 wherein the copolycondensate is dried under an atmosphere of protective gas or in a vacuum.

9. The method according to claim 6 wherein after being dried the copolycondensate is tempered for 1 to 100 hours at temperatures ranging from 150° to 300° C.

10. The method according to claim 9 wherein tempering is carried out under an atmosphere of protective gas or in a vacuum.

11. The method according to claim 6 wherein the product is subjected to grinding or classification by size, or both.

12. The method according to claim 6, wherein methanol, ethanol, n- and i-propanol, n- and i-butanol or n-pentanol or mixtures thereof are used as the solvent during the hydrolysis.

13. The method according to claim 6, wherein the hydrolysis is carried out with an excess of water.

14. The method according to claim 6, wherein the monomeric components according to formulas V and VI and the cross-linking agent or agents optionally present are precondensed together 5 minutes to 72 hours in the presence of 1 to 100 mole % of the amount of water stoichiometrically required for complete hydrolysis at room temperature up to 200° C.

15. The method according to claim 14 wherein a condensation catalyst is employed.

16. The method according to claim 14 wherein the reaction mixture is gelled by adding more solvent or water is added thereto.

17. The method according to claim 14 wherein the agitation of the solid up to 48 hours is carried out at normal pressure or at a pressure which corresponds to the sum of the partial temperatures at the particular pressure.

18. The method of preparing block organosiloxane copolycondensates comprising precondensing independently of each other a tertiary amino organosilane of the formula:

  (V)

and an organofunctional silane of the formula:

$X-R^9$  (VI)

in an amount sufficient to form the desired copolycondensate $R^6$ to $R^9$ are identical or different and signify a group of the formula:

$R^5-Si(OR^{10})_3$  (VII), $R^5$ has the same meaning as in formula III in claim 1, $R^{10}$ signifies a linear or branched alkyl with 1 to 5 C atoms and X has the same meaning as in formula II in claim 1, and optionally one or more cross-linking agents of the formula:

$M(OR)_{2-4}R'_{0-2}$ or $Al(OR_{2-3}R'_{0-1}$  (VIII)

wherein M is a silicon, titanium or zirconium atom,
R' is linear or branched alkyl with 1 to 5 C atoms or phenyl and
R is linear or branched alkyl with 1 to 5 C atoms and wherein the ratio of the silicon atoms from the groups of formula VII to the M or AL atoms in the cross-linking agents is 1 : 0 to 1 : 10, said precondensing being carried out by dissolving said silane and optionally said cross-linking agent separately with or without a solvent which is miscible with water and is capable of dissolving amino organosilanes according to formula V and organofunctional silanes according to formula VI as well as cross-linking agents, adding an amount of water thereto under agitation in the presence of 1 to 100 mole % of the amount of water which is sufficient for a complete hydrolysis for 5 minutes to 72 hours at room temperature to 200° C., optionally with the addition of a condensation catalyst, combining the precondensates so produced, and optionally additional solvent, thereafter separating the copolycondensate formed thereby from the liquid phase.

19. The method according to claim 18 wherein the copolycondensate product is washed and dried at 250° C.

20. The method according to claim 19 wherein said product is tempered subsequently 1 to 100 hours at temperatures ranging from 150° to 300° C. under an atmosphere of protective gas or in a vacuum, and is optionally ground and/or classified.

21. A method of preparing mixed copolycondensates comprising in a first step precondensing only a portion of the monomer required to produce the desired product by selecting an amount of a tertiary amino organosilane of the formula:

  (V)

and an organofunctional silane $X-R^9$  (VI)

in an amount sufficient to form the desired copolycondensate $R^6$ to $R^9$ are identical or different and signify a group of the formula:

$R^5-Si(OR^{10})_3$  (VII).

$R^5$ has the same meaning as in formula III in claim 1, $R^{10}$ signifies a linear or branched alkyl with 1 to 5 C atoms and X has the same meaning as in formula II in claim 1, optionally after the addition of a non-stoichiometric amount of one or more cross-linking agents of the general formula:

$M(OR)_{2-4}R'_{0-2}$ or $Al(OR)_{2-3}R'_{0-1}$  (VIII)

whereby M is silicon, titanium or zirconium,
R' is linear or branched alkyl with 1 to 5 C atoms or phenyl and
R is linear or branched alkyl with 1 to 5 C atoms and whereby the ratio of the silicon atoms from the groups of formula VII to the M or Al atoms in the cross-linking agents is 1 : 0 to 1 : 10,
precondensing each of said silanes of formulas V and VI independently from each other by mixing with each silane an amount of water under agitation which is sufficient for a 1 to 100% hydrolysis for 5 minutes to 72 hours with or without using a solvent at room temperature to 200° C., optionally with the addition of a condensation catalyst to obtain a separate precondensate of each, then combining the precondensates with the non-precondensed silanes of formula V and VI, adding additional water to the combined precondensates, optionally adding more solvent, then separating the copolycondensate formed thereby from the liquid phase to recover the product.

22. The method according to claim 20 wherein the product is washed and dried at room temperature to 250° C., optionally under an atmosphere of protective gas or in a vacuum, optionally tempered subsequently 1 to 100 hours at temperature ranging from 150° to 300° C. under an atmosphere of protective gas or in a vacuum, optionally ground and/or classified by size.

* * * * *